United States Patent Office 3,616,769
Patented Nov. 2, 1971

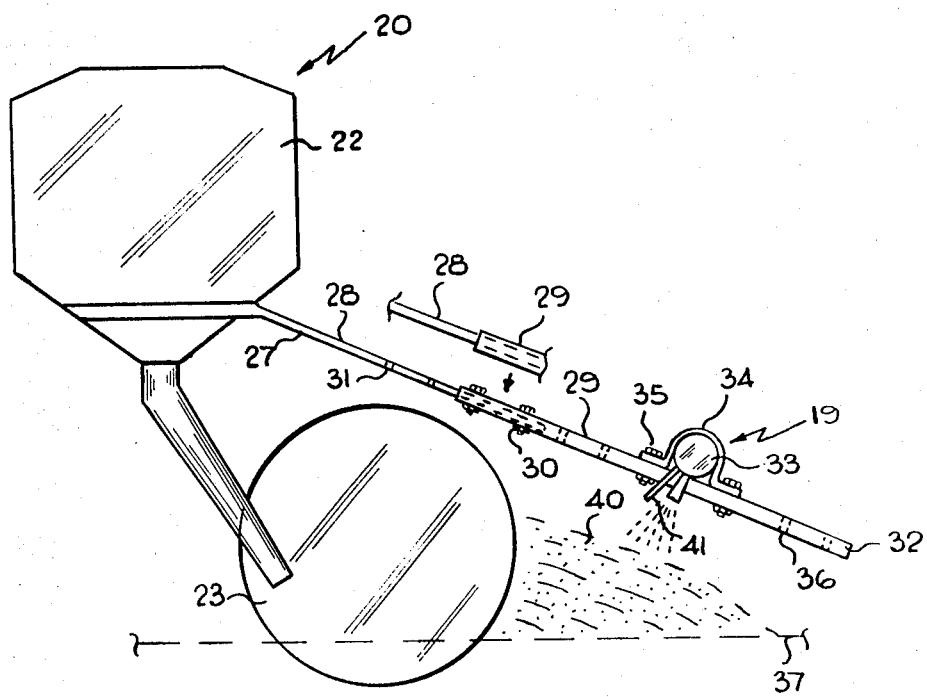
Fig-2
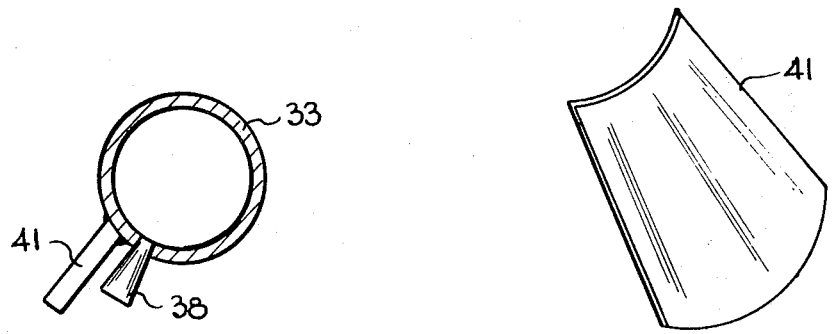
Fig-3
Fig-4

3,616,769
WILD OAT SPRAYER ATTACHMENT
William E. Normand, 3003 Assiniboine Ave.,
Regina, Saskatchewan, Canada
Filed Nov. 26, 1969, Ser. No. 880,145
Claims priority, application Canada, Jan. 20, 1969,
40,540
Int. Cl. A01g 23/02
U.S. Cl. 111—6      1 Claim

ABSTRACT OF THE DISCLOSURE

A spray boom is mounted upon a tilling implement so that it can direct the spray directly upon the soil being turned by the disks or tillage members. An arcuately curved shield directs the spray downwardly into the turned soil before it turns completely over so that the spray becomes trapped by the soil, and also prevents the soil from coming into contact with the spray prematurely.

---

This invention relates to new and useful improvements in wild oat sprayer attachments for tilling implements.

Although the enclosed drawings show a combination disker and seeder assembly, nevertheless it will be appreciated that the device can be attached and used in cooperation with any tilling implement such as diskers, seeders, rod weeders or in fact, any implement which actually turns soil for tilling or cultivating purposes.

The principal object and essence of the invention is to provide a spray boom assembly attached rearwardly of the tilling assembly so that a liquid chemical can be sprayed directly upon the earth as it is being turned or tilled so that when the turning or tilling action is completed, the chemical is intimately mixed and entrapped by the soil thus giving good penetration and coverage and reducing evaporation.

Another object of the invention is to provide a device of the character herewithin described which although primarily directed to wild oat spraying, nevertheless can easily be adapted for use with the spraying of other chemicals such as herbicides, fungicides or the like.

A yet further object of the invention is to provide a device of the character herewithin described which enables a tiller and seeder implement to be used, the necessary herbicides to be sprayed onto the soil being tilled, and land packers behind the implement to pack the soil intimately thus enabling all of these various treatments to be carried out in one operation.

Still another object of the invention is to provide a device of the character herewithin described which is simple in construction, economical in operation and otherwise well suited to the purpose for which it is designed.

With the foregoing in view, and such other or further purposes, advantages or novel features as may become apparent from consideration of this disclosure and specification, the present invention consists of the inventive concept which is comprised, embodied, embraced or included in the method, process, construction, composition, arrangement of parts, or new use of any of the foregoing, herein exemplified in one or more specific embodiments of such concept, reference being had to the accompanying figures in which:

FIG. 2 is a cross sectional schematic showing the relationship of the spray assembly to the tilling assembly.

FIG. 3 is an enlarged cross sectional view of the spray boom showing the shroud.

FIG. 4 is an enlarged isometric of one of the shrouds per se.

In the drawings like characters of reference indicate corresponding parts in the different figures.

Figure 1:
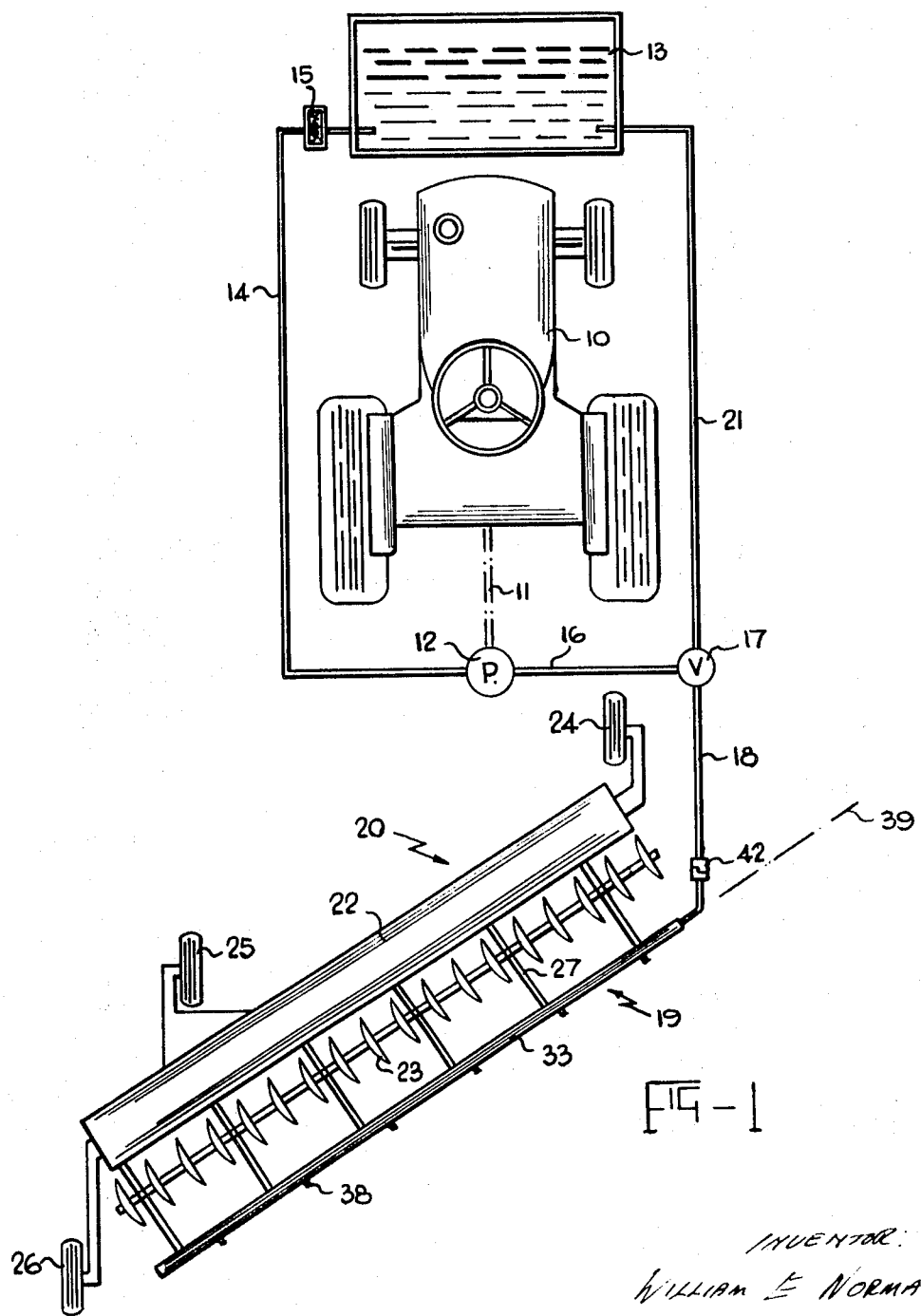
FIG. 1 is a plan view schematic showing my invention in conjunction with a disk tiller-seeder.

It is well known that farmers, particularly grain farmers in the East, suffer considerably from wild oat infestation in many areas.

Wild oats are particularly difficult to eliminate and it is only recently that chemicals have been produced which can be utilized for the elimination of wild oat growth.

It has been found best to use a pre-emergent herbicide rather than attempt to spray the wild oats once they have sprouted and this, of course, presents some difficulties under certain circumstances.

The chemical solution for instance, is not effective if added to a dry soil. Wind can prevent uniform coverage and excessive trash on the surface can reduce effectiveness if the herbicide is just sprayed over the trash.

Furthermore it is necessary to keep the chemical clear of the grain seed being planted otherwise germination may be adversely affected.

The present invention enables the operator to till the soil, seed the soil, and spray the upper level of the soil all in one operation thus preventing the herbicide from coming into contact with the grain seed but intimately mixing same in the upper 0 to 6 inches of the soil thus coming into contact with the wild oat seeds turned up during the tilling operation.

By spraying the chemicals directly into the moist turbulent soil rather than the surface soil, a considerable reduction in quantity of chemical used can be made. Since the chemical is very volatile, less chemical is lost due to evaporation by bringing it into direct contact with the moist soil.

With the normal surface spraying method it is desirable to leave the soil as loose as possible prior to spraying in order to facilitate good chemical penetration. With the present method of spraying hereinafter to be described, land packers can be pulled directly behind the tiller-seeder. The results are proper conservation of ground moisture thus assuring good crop germination. It also eliminates the extra operation of packing to seal in the ground moisture.

The spraying action is relatively close to the soil surface thus enabling the spraying to be conducted in relatively high winds whereas normal surface spraying cannot be done successfully in wind velocities beyond 10 miles per hour.

Proceeding therefore to describe the invention in detail, reference should first be made to FIG. 1 in which reference character 10 shows schematically a tractor operating as a towing source and having a power take-off indicated at 11 which drives a fluid pump 12 supported upon the tractor in a conventional manner. A fluid reservoir 13 is mounted forwardly of the tractor also upon the chassis and an intake conduit or line 14 extends from the reservoir, via a filter 15, to the intake side of pump 12. From there the pump pumps the liquid through conduit 16 to a metering valve 17 and thence by a pressure line or conduit 18 to a spray boom assembly collectively designated 19 situated behind a disk-tiller-seeder assembly collectively designated 20. A by-pass line 21 extends from the metering valve back to the reservoir in the usual way.

The disk-tiller-seeder also shown schematically in FIG. 1 consists of a seed box 22 supported above and forwardly of sets of disc gangs 23 and being supported by means of front land wheel assembly 24, rear land wheel assembly 25, and a rudder wheel assembly 26 all of which are conventional.

A plurality of arms 27 are secured to the frame of the disk-tiller-seeder by bolts (not illustrated) and these arms extend rearwardly and downwardly in an inclined direction as clearly shown on FIG. 2. These arms consist of an inner fixed portion 28 and an outer slidable portion 29, the two telescoping together and being bolted by means of bolts 30 but permitting extension or retraction of the length of the arms within limits due to a plurality of apertures 31 in the telescoping portions of the arms 28 and 29.

Adjacent the lower or outer end 32 of the arm 27 I support a transversely situated spray boom assembly 19 which includes a spray boom pipe 33. This pipe is secured to the arm portions 29 by means of clamps 34 extending over the boom tube 33 and being bolted to the arm portion 29 by means of bolts 35. A plurality of apertures 36 can be provided within the arm portion 29 thus allowing a certain amount of adjustment of the boom tube 33 with relation to the lowermost end 32. Due to the inclination of the arms 27, the spray boom tube 33 can be adjusted within limits with reference to ground or soil level 37 either by moving the telescopic portions 28 and 29 with respect to one another, or alternatively, by moving the boom tube 33 along the portion 29 and bolting it into position.

Spray nozzles 38 of conventional design are secured to the boom tube 33 and extend downwardly and forwardly with reference to the longitudinal axis 39 of the boom tube. The preferred angular relationship of the nozzles to the vertical is 30 degrees although this can be varied as desired.

In operation, the metering valve together with a conventional shut-off valve (not illustrated) enables the pump 12 to pump the chemical herbicide in fluid form from the reservoir 13, to the pressure line or conduit 18 and thence to the spray boom 33 whereupon it is sprayed downwardly and forwardly as clearly shown in FIG. 2 so that it strikes the moist turned or tilled earth indicated by reference character 40 and is entrapped as this earth turns over in the usual way. The pressure used and the height of the nozzles above the ground level control the depth of penetration of the herbicide within the soil but this should preferably be from between 0 to 6 inches.

I have found also that the spray nozzles should be situated from between 4 inches and 10 inches above the ground level for best effect.

Due to the relative closeness of the nozzles to the turned or tilled earth 40, it is necessary to ensure that earth and/or trash on the surface thereof does not block the nozzles 38. In this regard I provide an arcuately curved trash shield or shroud 41 welded to the tube 33 and partially surrounding the nozzles 38 in a forward direction as clearly shown in FIG. 3.

The length of this shroud should be greater than the length of the nozzle 38 also shown in FIG. 3.

Not only can the nozzle height above ground be adjusted as hereinbefore described but the angle at which the nozzles are set can easily be varied by rotating the boom tube 33 within the clamps 34 and then retightening bolts 35.

Various modifications can be made within the scope of the inventive concept disclosed.

What I claim as my invention is:

1. The combination of a seeding and soil tilling implement including a gang of discs, and a soil spraying attachment comprising a set of sloping arms secured to said implement and extending rearwardly and downwardly beyond said gang of discs, said arms having forward portions and rear portions slidably telescoped and adjustably fastened together so that the length of the arms may be varied, a set of clamps adjustably mounted on the rear portions of said arms, said clamps being adjustable forwardly and rearwardly on the rear arm portions, a spraying tube mounted in said clamps and disposed in parallel with and rearwardly of said gang of discs, a plurality of downwardly and forwardly projecting nozzles provided at longitudinally spaced points at the underside of said spraying tube, said tube being rotatably adjustable in said clamps so that said nozzles may be oriented to direct a spray onto soil as the latter is turned by the gang of discs, a plurality of guard plates secured to said tube forwardly of the respective nozzles, and means for delivering liquid to be sprayed to said tube.

References Cited

UNITED STATES PATENTS

| | | | |
|---|---|---|---|
| 1,970,984 | 8/1934 | Smith | 47—1.7 |
| 2,301,213 | 11/1942 | Kang | 47—1.7 |
| 1,176,464 | 3/1916 | King et al. | 111—6 X |
| 3,220,368 | 11/1965 | Gandrud | 111—73 X |

FOREIGN PATENTS

| | | |
|---|---|---|
| 723,105 | 2/1955 | Great Britain. |

ROBERT E. BAGWILL, Primary Examiner